US009469735B2

(12) United States Patent
Yoon et al.

(10) Patent No.: US 9,469,735 B2
(45) Date of Patent: Oct. 18, 2016

(54) METHOD OF MANUFACTURING COLORLESS TRANSPARENT POLYIMIDE FILM HAVING IMPREGNATED GLASS FABRIC AND OF FLATTENING SURFACE THEREOF

(71) Applicant: KOREA ADVANCED INSTITUTE OF SCIENCE AND TECHNOLOGY, Daejeon (KR)

(72) Inventors: Choon Sup Yoon, Daejeon (KR); Seung Hyun Oh, Jellabuk-do (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/768,018

(22) PCT Filed: Feb. 25, 2014

(86) PCT No.: PCT/KR2014/001511
§ 371 (c)(1),
(2) Date: Aug. 14, 2015

(87) PCT Pub. No.: WO2014/133297
PCT Pub. Date: Sep. 4, 2014

(65) Prior Publication Data
US 2016/0009882 A1    Jan. 14, 2016

(30) Foreign Application Priority Data

Feb. 27, 2013  (KR) .................. 10-2013-0021155
Mar. 27, 2013  (KR) .................. 10-2013-0032544
Jan. 27, 2014  (KR) .................. 10-2014-0009715

(51) Int. Cl.
*C08J 5/24* (2006.01)
*C08J 5/04* (2006.01)
(Continued)

(52) U.S. Cl.
CPC .. *C08J 5/24* (2013.01); *B32B 5/02* (2013.01); *C08J 5/00* (2013.01); *C08J 5/043* (2013.01); *C08J 5/18* (2013.01); *C08J 2379/08* (2013.01)

(58) Field of Classification Search
None
See application file for complete search history.

(56) References Cited

U.S. PATENT DOCUMENTS 3,647,529 A * 3/1972 Lubowitz ............... B29C 70/10
524/404

(Continued)

FOREIGN PATENT DOCUMENTS

JP    11-034221 A    2/1999
JP    2004-136354 A    5/2004
(Continued)

OTHER PUBLICATIONS

Abstracts of JP 60-240740, Nov. 1985.*
(Continued)

*Primary Examiner* — Erma Cameron
(74) *Attorney, Agent, or Firm* — Rabin & Berdo, P.C.

(57) ABSTRACT

Disclosed is a method of manufacturing a colorless transparent polyimide film having impregnated glass fabric, wherein the surface of the polyimide film substrate having impregnated glass fabric is flattened by two flattening steps using a roll-to-roll process, thereby solving problems with an increase in surface roughness of the polyimide substrate when manufacturing the polyimide film having impregnated glass fabric in order to enhance thermal and mechanical properties of a film for use in flexible display substrates and in cover windows for flat panel displays and mobile phones. As the surface roughness of the polyimide film having impregnated glass fabric is flattened to the level of ones of nm from the level ranging of tens of nm to ones of μm, a thin film transistor process can be performed on the polyimide film substrate and the polyimide film is increased in optical transmittance and transparency and can thus be utilized as flexible display substrates and cover windows for flat panel displays and mobile phones.

9 Claims, 12 Drawing Sheets

(51) Int. Cl.
  *C08J 5/00* (2006.01)
  *B32B 5/02* (2006.01)
  *C08J 5/18* (2006.01)

(56) References Cited

U.S. PATENT DOCUMENTS

| | | | | |
|---|---|---|---|---|
| 3,654,227 A | * | 4/1972 | Dine-Hart | C08G 73/1028 264/137 |
| 5,124,199 A | * | 6/1992 | O'Quinn | B32B 27/08 156/246 |
| 2009/0078453 A1 | * | 3/2009 | Jung | C08G 73/1042 174/254 |
| 2012/0244330 A1 | | 9/2012 | Sun et al. | |
| 2013/0040517 A1 | * | 2/2013 | Oomori | C08K 3/0025 442/59 |
| 2014/0238594 A1 | * | 8/2014 | Yoon | G02F 1/133305 156/280 |

FOREIGN PATENT DOCUMENTS

| | | |
|---|---|---|
| JP | 2009-242715 A | 10/2009 |
| KR | 10-2010-0118220 A | 11/2010 |
| KR | 10-2010-0118222 A | 11/2010 |
| KR | 10-2011-0055425 A | 5/2011 |
| KR | 10-2012-0027632 A | 3/2012 |
| WO | WO 2011/033751 A1 | 3/2011 |
| WO | WO 2013-002614 A2 | 1/2013 |

OTHER PUBLICATIONS

Korean Office Action dated Sep. 19, 2014.

* cited by examiner ered to about 10 ppm/° C.
METHOD OF MANUFACTURING COLORLESS TRANSPARENT POLYIMIDE FILM HAVING IMPREGNATED GLASS FABRIC AND OF FLATTENING SURFACE THEREOF

TECHNICAL FIELD

The present invention relates to a method of manufacturing a colorless transparent polyimide film having impregnated glass fabric for use in a display substrate and of flattening the surface thereof. More particularly, the present invention relates to a method of manufacturing a colorless transparent polyimide (CPI) film having impregnated glass fabric and of flattening the surface thereof, wherein problems with an increase in surface roughness of a polyimide substrate may be prevented from occurring when manufacturing the colorless transparent polyimide film having impregnated glass fabric in order to enhance thermal and mechanical properties of a film for use in a flexible display substrate and in a cover window for a flat panel display and a mobile phone.

BACKGROUND ART

Currently, flat panel displays using techniques for e-paper displays (EPDs), plasma displays (PDPs), liquid crystal displays (LCDs), and organic light emitting displays (OLEDs) are being variously utilized in TV sets, mobile phones, monitors, e-books, mobile devices, etc.

In the next generation of technology, however, flexible displays which are easily portable and conveniently usable regardless of time and place are expected to be widely used in electronic devices such as mobile phones, portable terminals, laptop computers, etc.

A substrate for a flexible display has to be mechanically flexible so that the flexible display is efficiently bendable, rollable or foldable. The flexible substrate may include a very thin glass plate, a thin stainless steel plate, a plastic film, etc. Among them a plastic film is particularly useful.

Moreover, glass is currently commonly used as a cover window for flat panel displays such as TV sets, monitors, and mobile phones. Glass is superior in heat resistance, optical transmittance and mechanical strength but is heavy and brittle. In order to replace glass, a colorless transparent plastic film having superior thermal and optical properties is being studied in the related art.

Although a plastic film substrate has much higher mechanical flexibility than a glass substrate, it has inferior tensile strength. When glass fabric is impregnated in a plastic film, tensile strength of a plastic film, such as fiber reinforced plastic (FRP), may be enhanced as high as that of tempered glass. It has been widely utilized, as disclosed in Korean Patent Application Publication No. 10-2010-0118220 (Title: Flexible substrate for display panel and manufacturing method of the same), Korean Patent Application Publication No. 10-2010-0118222 (Title: A flexible substrate for display panel and a method for manufacturing the same), Korean Patent Application Publication No. 10-2012-0027632 (Title: Fabrication method of flexible device), and Korean Patent Application Publication No. 10-2011-0055425 (Title: Polymer-organic nano-fiber composite having superior thermal expansion property and light-transmission and transparent composite film).

A polyimide film has high mechanical flexibility and is superior in heat resistance, wear resistance, insulating properties, chemical resistance and mechanical strength. This polyimide film has been variously utilized in electronic components, such as insulating films, flexible cables or printed circuit boards (PCBs). A typical polyimide film has dark brown color and thus is not being used in display substrates, despite its superior physical properties as described above. Recently, colorless transparent polyimide is being developed and can be used as a display substrate.

In order to manufacture a display device, a thin film transistor (TFT) should be provided on a substrate to control switching and luminance of individual pixels. Currently available is TFT using amorphous silicon, polysilicon, oxides, organic material, etc. In the case of amorphous silicon that exhibits very stable performance, the minimum processing temperature necessary for deposition and thermal treatment is about 230° C. When a plastic substrate is subjected to a TFT thin film process at 230° C. and then cooled to room temperature, the TFT thin film may be stripped off from the plastic substrate due to a difference in the coefficient of thermal expansion (CTE) between the plastic substrate and the TFT thin film material. To prevent this, the CTE of the substrate should be equal to or less than 10 Ppm (part per million)/° C.

Colorless transparent polyimide (CPI) has a CTE of at least 50 ppm/° C. However, when glass fabric having a CTE of about 5 ppm/° C. is incorporated in the colorless transparent polyimide film, the CTE of the colorless transparent polyimide film having impregnated glass fabric may be lowered to about 10 ppm/° C.

In the course of forming a colorless transparent polyimide film having impregnated glass fabric using a solution process, the surface of the film may be inevitably roughened to the level of tens of nm~1 μm for the following reasons.

When glass fabric is placed on a glass plate and then impregnated with a polyamic acid solution, the surface of the polyamic acid solution may become completely flat under the force of gravity. However, because the woven surface of the glass fabric is not flat, the thickness from the surface of the glass fabric to the surface of the polyamic acid solution may vary depending on the position.

Specifically, the polyamic acid solution at the portion of the glass fabric where glass fibers are over-positioned may become thin, whereas the polyamic acid solution at the portion of the glass fabric where glass fibers are under-positioned may become thick (FIG. 1a). Then, when the solvent is evaporated and polymerization occurs in the course of forming the colorless transparent polyimide film, a small degree of shrinkage occurs at the portion where the solution is thin and a large degree of shrinkage takes place at the portion where the solution is thick. Accordingly, the surface of the formed colorless transparent polyimide film has irregularities similar to the surface topography of the glass fabric (FIG. 1b), and the surface roughness thereof ranges from tens of nm to 1 μm depending on the thickness of the glass fabric.

When the surface of the substrate is roughened, even if the refractive index of the colorless transparent polyimide film is matched with that of the glass fabric, surface roughness of the order of tens of nm~1 μm may cause scattering of light, thus drastically reducing optical transmittance and transparency of the substrate and also making it difficult to perform a TFT process necessary for manufacturing a display device.

To increase optical transmittance and transparency of the substrate and to make a TFT process to be feasible on the substrate, the substrate should have a surface roughness of the order of 1 nm.

Because a typical thin-film coating used to flatten the surface of a display substrate has a thickness of a few nm, the surface of the film having a roughness of the order of tens of nm~1 μm is difficult to be flattened so as to attain a surface roughness of about 1 nm by the above thin-film coating.

Therefore, in order for the surface of the colorless transparent polyimide film having impregnated glass fabric to be flattened to a surface roughness of the order of 1 nm using the thin-film coating, the surface roughness of the colorless transparent polyimide film having impregnated glass fabric needs to be controlled to the level of ones of nm.

DISCLOSURE

Technical Problem

Accordingly, the present invention has been made to solve the above problems occurring in the prior art, and an object of the present invention is to provide a method of manufacturing a polyimide film having impregnated glass fabric, including two steps of flattening process.

Another object of the present invention is to provide a method of flattening the surface of a polyimide film having impregnated glass fabric, which enables continuous process of flattening of the inevitably roughened surface of a colorless transparent polyimide film when manufacturing the film having impregnated glass fabric in order to enhance thermal and mechanical properties of a substrate which is utilized for a flexible display and is used to replace a glass substrate for a flat panel display.

A further object of the present invention is to provide a colorless transparent polyimide film, manufactured by the above method.

Technical Solution

In order to accomplish the above objects, the present invention provides a method of manufacturing a polyimide film having impregnated glass fabric, including a first and a second flattening step.

In the first flattening step, a solvent is evaporated from a colorless transparent polyamic acid solution that is a polyimide precursor to thus form a film, after which the film is located between two cylindrical rollers having smooth surfaces, and then the film is passed between the two rollers with being pressed by adjusting the spacing between the two rollers, whereby the surface of the film is flattened.

In the course of manufacturing the flattened colorless transparent polyamic acid film into a colorless transparent polyimide film by imidization, ring-closing and dehydration may occur, and thus the surface of the colorless transparent polyimide film is roughened again. As such, the roughness of the colorless transparent polyimide film is much lower than that of the polyamic acid film which has not been flattened.

In the second flattening step, the roughened surface of the colorless transparent polyimide film obtained by imidization is flattened. Specifically, the colorless transparent polyimide film is located between another pair of cylindrical rollers having smooth surfaces, and the film is passed between the two rollers with being pressed by adjusting the spacing between the pair of rollers, whereby the surface of the film is flattened.

In addition, the present invention provides a method of flattening the surface of a polyimide film having impregnated glass fabric, comprising flattening a polyamic acid film having impregnated glass fabric; and flattening a polyimide film formed from the polyamic acid film nflattened in the first flattening step.

In addition, the present invention provides a colorless transparent polyimide film having impregnated glass fabric, manufactured by the aforementioned method.

Advantageous Effects

According to the present invention, the surface roughness of a colorless transparent polyimide film substrate having impregnated glass fabric, which is utilized for a flexible display and is used to replace a glass substrate, can be flattened to the level of ones of nm from the level of tens of nm~1 μm, thereby preventing surface scattering of light, consequently increasing optical transmittance and transparency of the colorless transparent polyimide film substrate having impregnated glass fabric and making it possible to perform a TFT process on the substrate.

DESCRIPTION OF THE REFERENCE NUMERALS IN THE DRAWINGS

Figure 1A:
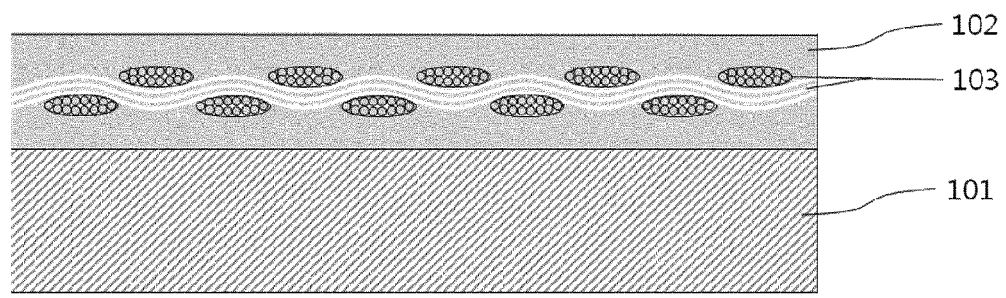
FIGS. 1a and 1b are schematic views illustrating the cause of high surface roughness of a colorless transparent polyamic acid film or polyimide film having impregnated glass fabric.
Figure 1B:
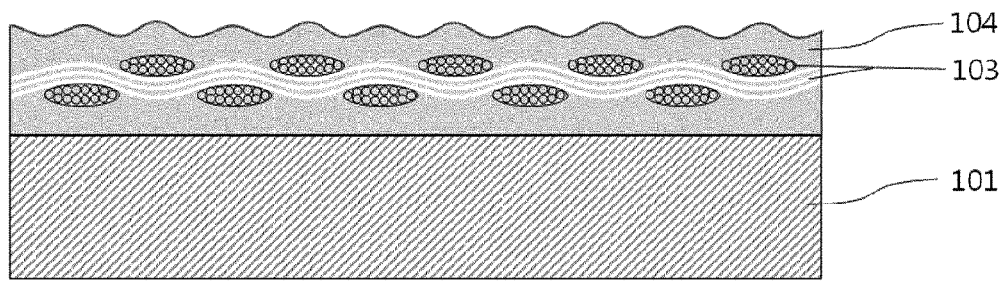

101: substrate
102: polyamic acid solution
103, 203, 302, 402, 503: glass fabric
104, 301: surface-roughened colorless transparent polyamic acid film having impregnated glass fabric 201: portion of lower roller coming into contact with surface-roughened colorless transparent polyamic acid film or polyimide film 202, 401: surface-roughened colorless transparent polyamic acid film having impregnated glass fabric or surface-roughened colorless transparent polyimide film having impregnated glass fabric 204: portion of upper roller coming into contact with surface-roughened colorless transparent polyamic acid film or polyimide film 305, 315, 405: lower roller 306, 316, 406: upper roller 303, 313, 403: heater of lower roller 304, 314, 404: heater of upper roller 307, 317, 407: shaft of lower roller 308, 318, 408: shaft of upper roller 309: surface-flattened colorless transparent polyamic acid film having impregnated glass fabric 310: surface-roughened colorless transparent polyimide film having impregnated glass fabric 319: surface-flattened colorless transparent polyimide film having impregnated glass fabric 409: surface-flattened colorless transparent polyamic acid film having impregnated glass fabric or surface-flattened colorless transparent polyimide film having impregnated glass fabric 501: lower glass plate 502: surface-roughened colorless transparent polyimide film having impregnated glass fabric 504: upper glass plate 505: lower heater 506: upper heater 507: lower flat plate 508: upper flat plate 509: surface-flattened colorless transparent polyimide film having impregnated glass fabric

BEST MODE

Hereinafter, a detailed description will be given of the present invention.

The present invention addresses a method of manufacturing a polyimide film having impregnated glass fabric, including two flattening steps.

In the present invention, the method of manufacturing the polyimide film having impregnated glass fabric comprises:

(1) impregnating glass fabric with a polyamic acid solution, thus obtaining a polyamic acid film having impregnated glass fabric;

(2) flattening the polyamic acid film having impregnated glass fabric obtained in (1) (first flattening);

(3) subjecting the polyamic acid film obtained in (2) to imidization, thus obtaining a polyimide film having impregnated glass fabric; and (4) flattening the polyimide film having impregnated glass fabric obtained in (3) (second flattening).

According to the present invention, two flattening steps are specified below.

In the present invention, the colorless transparent polyamic acid film may be formed in such a manner that a dianhydride compound and a diamine compound are dissolved in a solvent and then polymerized thus obtaining a polyamic acid solution from which the solvent is then evaporated. The polyamic acid film is heated and dried at a temperature of 80° C. or less for about 30 min, resulting in a self-supporting polyamic acid film.

In the colorless transparent polyamic acid film, which have a surface roughness of about 0.3 μm, a ring-closing reaction does not occur between a glass transition temperature ($T_g$) of the film and an imidization temperature thereof, and thus the main chain of the polymer may have a long-range segmental motion. Hence, when pressure is applied to the polyamic acid film, deformation of the colorless transparent polyamic acid film may be easily induced.

Figure 2:
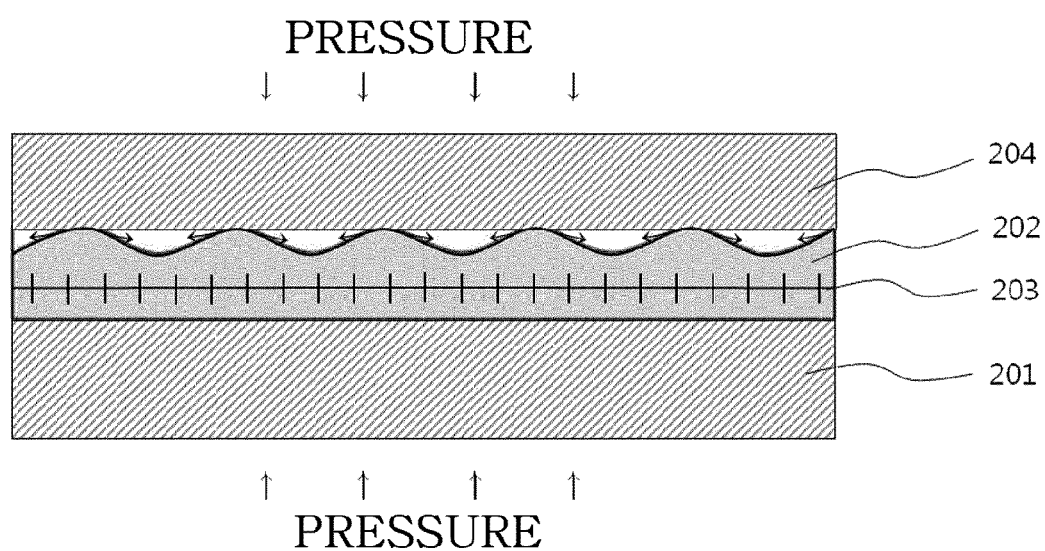
FIG. 2 is a schematic view illustrating the principle of flattening the surface of a colorless transparent polyamic acid film or polyimide film having impregnated glass fabric.

The colorless transparent polyamic acid film having high surface roughness is located between two cylindrical rollers having smooth surfaces. Then, the two rollers are rotated in opposite directions with a predetermined pressure being applied to the colorless transparent polyamic acid film by narrowing the spacing between the two rollers at a temperature between the glass transition temperature of the polyamic acid film and the imidization temperature thereof. Thereby, the polymer at the higher position of the surface of the film moves to the lower position (FIG. 2), and the surface of the polyamic acid film is flattened to the level similar to the surface roughness of the two rollers for applying the pressure (FIG. 3c).

Figure 3A:
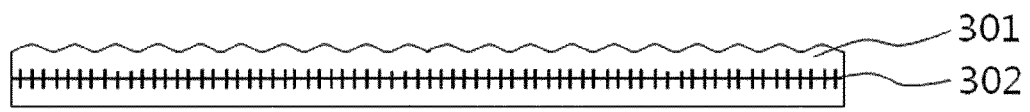
FIGS. 3a to 3f are schematic views illustrating a process of manufacturing a polyimide film having impregnated glass fabric including two flattening steps according to the present invention.
Figure 3B:
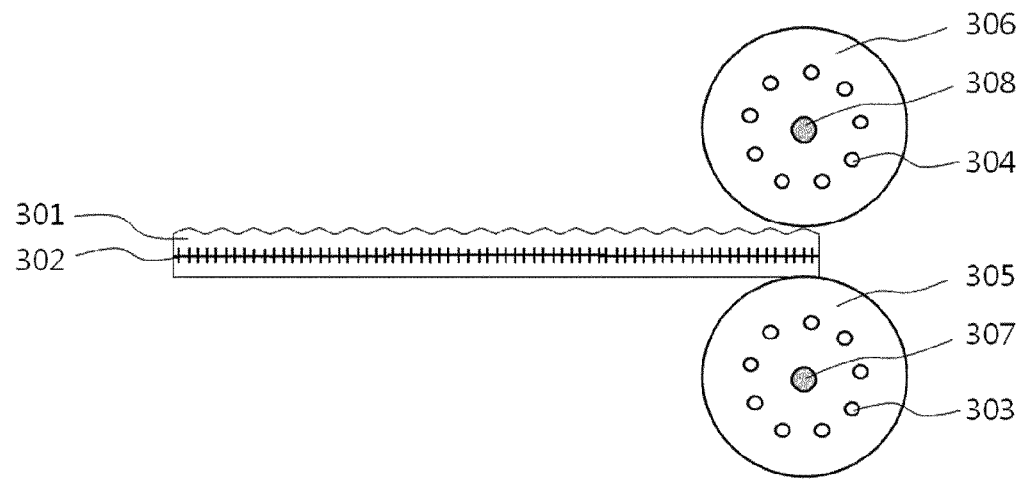
Figure 3C:
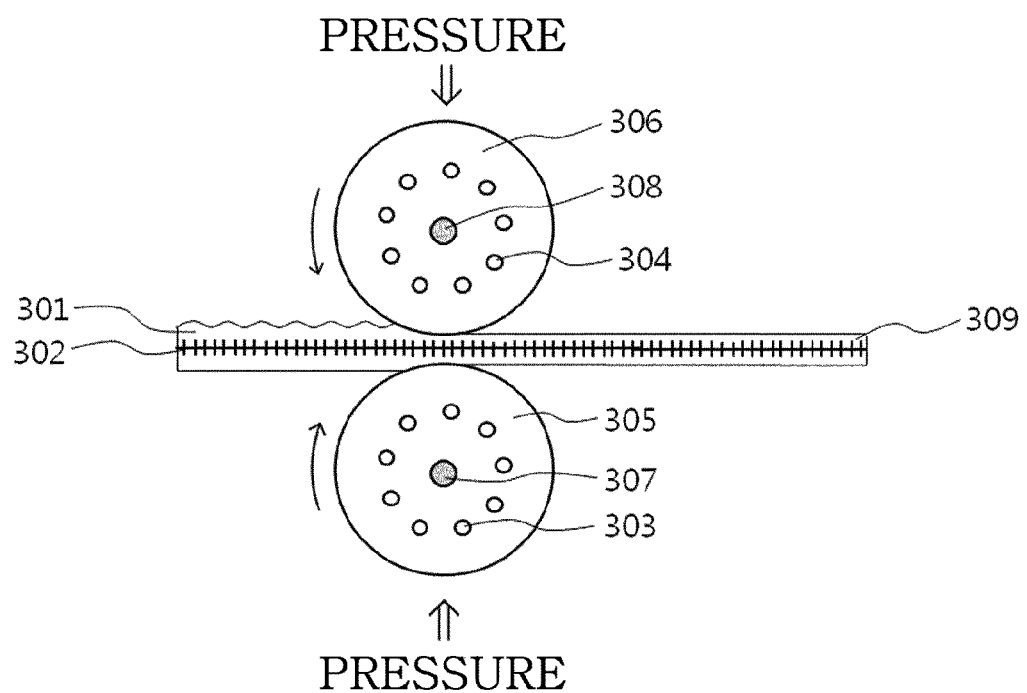
Figure 3D:
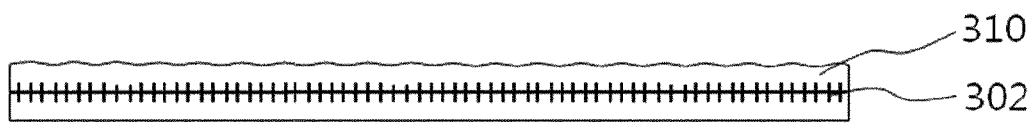

However, when a colorless transparent polyimide film is formed from the flattened colorless transparent polyamic acid film by thermal or chemical imidization, the surface roughness thereof is increased again to the level of tens of nm due to ring-closing and dehydration (FIG. 3d).

The main chain of the polymer of the colorless transparent polyimide film has a long-range segmental motion at a temperature equal to or higher than the glass transition temperature of the polyimide film. Thus, when pressure is applied to the colorless transparent polyimide film at a temperature equal to or higher than the glass transition temperature of the polyimide film, deformation of the colorless transparent polyimide film may be induced. The colorless transparent polyimide film is positioned between two cylindrical rollers having smooth surfaces, after which the two rollers are rotated in opposite directions with a predetermined pressure being applied to the colorless transparent polyimide film by narrowing the spacing between the two rollers at a temperature between the glass transition temperature of the colorless transparent polyimide film and the thermal decomposition temperature thereof. Thereby, the polymer at the higher position of the surface of the film moves to the lower position (FIG. 2), so that the surface of the colorless transparent polyimide film is flattened to the level similar to the surface roughness of the two rollers which function to apply the pressure (FIG. 3f).

In the present invention, the dianhydride compound preferably includes any one or a mixture of two or more selected from the group consisting of 4,4'-oxydiphthalic anhydride (OPDA), pyromellitic dianhydride (PMDA), 3,3',4,4'-diphenylsulfone tetracarboxylic dianhydride (DSDA), 3,3',4,4'-benzophenone tetracarboxylic dianhydride (BTDA), 4-(2,5-dioxotetrahydrofuran-3-yl)-1,2,3,4-tetrahydronaphthalene-1,2-dicarboxylic anhydride (DTDA), 4,4'-bisphenol A dianhydride (BPADA), 4,4'-M (hexafluoroisopropylidene) diphthalic anhydride (6FDA), bicycle[2.2.2]oct-7-ene-2,3,5,6-tetracarboxylic dianhydride (BCDA), 3,3',4,4'-biphenyl tetracarboxylic dianhydride (BPDA), 5-(2,5-dioxotetrahydrofuryl)-3-methyl-3-cyclohexene-1,2-dicarboxylic anhydride (DOMDA), ethylene diamine tetraacetic dianhydride (EDTE), and 1,2,4,5-cyclohexanetetracarboxylic dianhydride (CHDA).

The diamine compound preferably includes any one or a mixture of two or more selected from the group consisting of 2,2-bis(3-amino-4-hydroxyphenyl)hexafluoropropane (BAHFP), 1,3-bis(3-aminophenoxy)benzene (m-BAPB), 4,4'-bis(4-aminophenoxy)biphenyl (p-BAPB), 2,2-bis(3-aminophenyl)hexafluoropropane (BAPF), bis[4-(3-aminophenoxy)phenyl]sulfone (m-BAPS), 2,2-bis[4-(4-aminophenoxy)phenyl]sulfone (p-BAPS), bis(3-aminophenyl) sulfone (APS), m-xylylenediamine (m-XDA), p-xylylenediamine (p-XDA), 3,4'-oxydianiline (3,4-ODA), 2,2-bis(3-amino-4-methylphenyl)hexafluoropropane (BAMF), 4,4'-diaminooctafluorobiphenyl, 3,3'-dihydroxybenzidine, 2,2'-ethylenedianiline, 2,2'-bis(trifluoromethyl) benzidine (TFB), 2,2',5,5'-tetrachlorobenzidine, bis(3-aminophenyl)methanone, 2,7-diaminofluorene, 2-chloro-p-phenylenediamine, 1,3-bis(3-aminopropyl)-tetramethyldisiloxane, 1,1-bis(4-aminophenyl)cyclohexane, 9,9-bis(4-aminophenyl)fluorene, 5-(trifluoromethyl)-1,3-phenylenediamine, 4,4'-methylenebis(2-methylcyclohexylamine), 4-fluoro-1,2-phenylenediamine, 4,4'-(1,3-phenylenediisopropylidene)bisaniline, 4-nitro-1,3-phenylenediamine, 4-chloro-1,3-phenylenediamine, 1,3,5-triazine-2,4,6-triamine (Melamine), 3,5-diaminobenzonitrile, 1,3-bis(aminomethyl)cyclohexane (m-CHDA), 1,4-bis(aminomethyl)cyclohexane (p-CHDA), 2,2-bis[4-(4-aminophenoxy)phenyl]hexafluoropropane (6FBAPP), 2,2'-bis(trifluoromethyl)benzidine (MDB), 4,4'-oxydianiline (4,4'-ODA), 2,2-bis[4-(4-aminophenoxy)phenyl]propane (BAPP), 1,3-cyclohexanediamine, 1,4-cyclohexanediamine, and bis(4-aminophenyl) sulfide (4,4'-SDA).

Also in the present invention, the method of preparing the polyamic acid solution is not particularly limited, and any method may be used so long as it is a typical synthesis method.

Also in the present invention, the solvent for dissolving the dianhydride compound and the diamine compound is exemplified by dimethyl acetamide (DMAc), but the present invention is not limited thereto.

Also in the present invention, the polyamic acid solution with which glass fabric has been impregnated is heated in a temperature range of 40~150° C. to evaporate the solvent, thus forming the polyamic acid film having impregnated glass fabric. Thermal curing of the polyamic acid film using a thermal process enables imidization in the temperature range of 100~300° C., resulting in a polyimide film having impregnated glass fabric.

Also in the present invention, the first or the second flattening step is preferably implemented by passing the polyamic acid film or polyimide film having impregnated glass fabric between two cylindrical rollers so as to be flattened. As such, the width of the polyamic acid film or the polyimide film is preferably equal to or less than the length of the two rollers. If the width of the polyamic acid film or polyimide film having impregnated glass fabric is greater than the length of the two rollers, the portion of the film larger than the rollers is not flattened because pressure is not applied thereto.

Also, the polyamic acid film or polyimide film having impregnated glass fabric is preferably positioned in the central part of the two rollers so that pressure is uniformly applied from the two rollers.

The rollers may be made of cylindrical stainless steel or cylindrical glass, having a hard surface and a surface roughness of 0.5 to 2 nm with a melting temperature of 500° C. or higher.

The temperature of the rollers is adjusted to between the glass transition temperature of the polyamic acid film having impregnated glass fabric and the imidization temperature thereof in the first flattening step, and is adjusted to between the glass transition temperature of the polyimide film having impregnated glass fabric and the thermal decomposition temperature thereof in the second flattening step.

Figure 4:
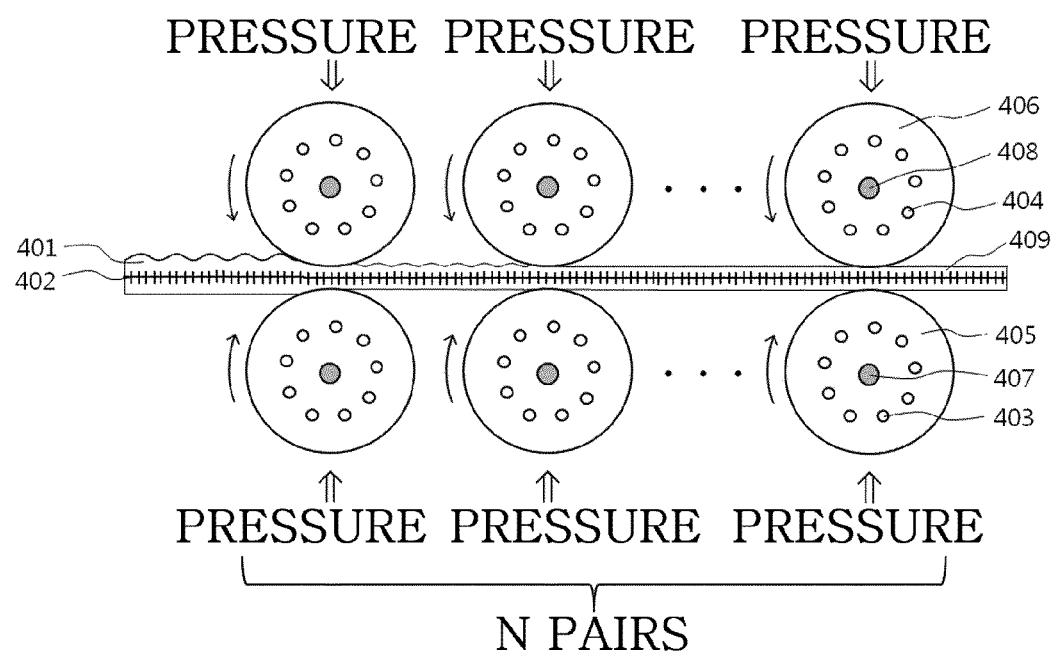
FIG. 4 is a schematic view illustrating a process of flattening a colorless transparent polyamic acid film or polyimide film having impregnated glass fabric using N pairs of rollers according to the present invention.
Figure 5A:
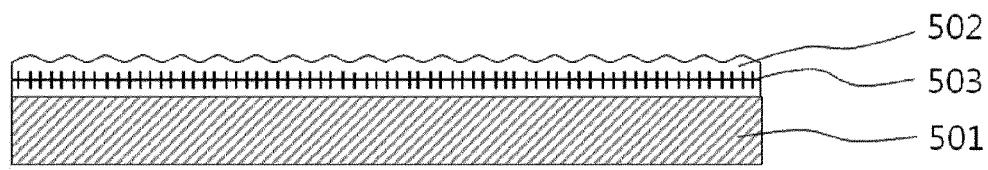
FIGS. 5a to 5f are schematic views illustrating a process of flattening a polyimide film having impregnated glass fabric using flat plates according to the present invention.
Figure 5B:
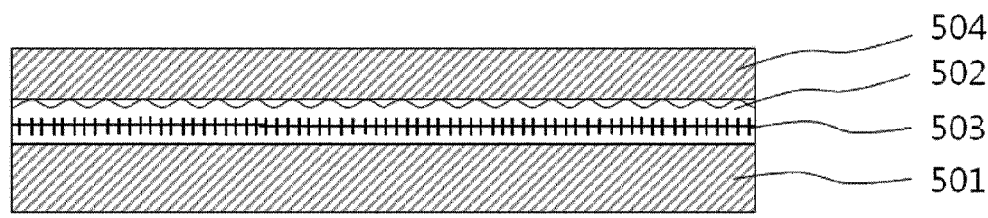
Figure 5C:
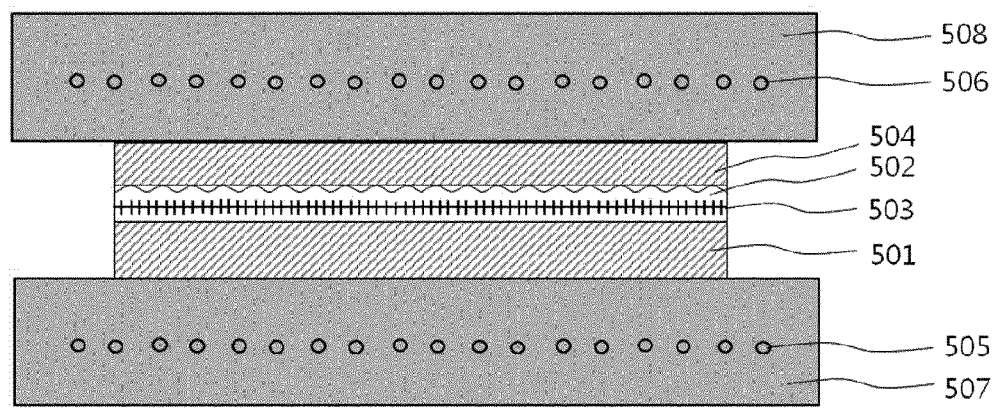
Figure 5D:
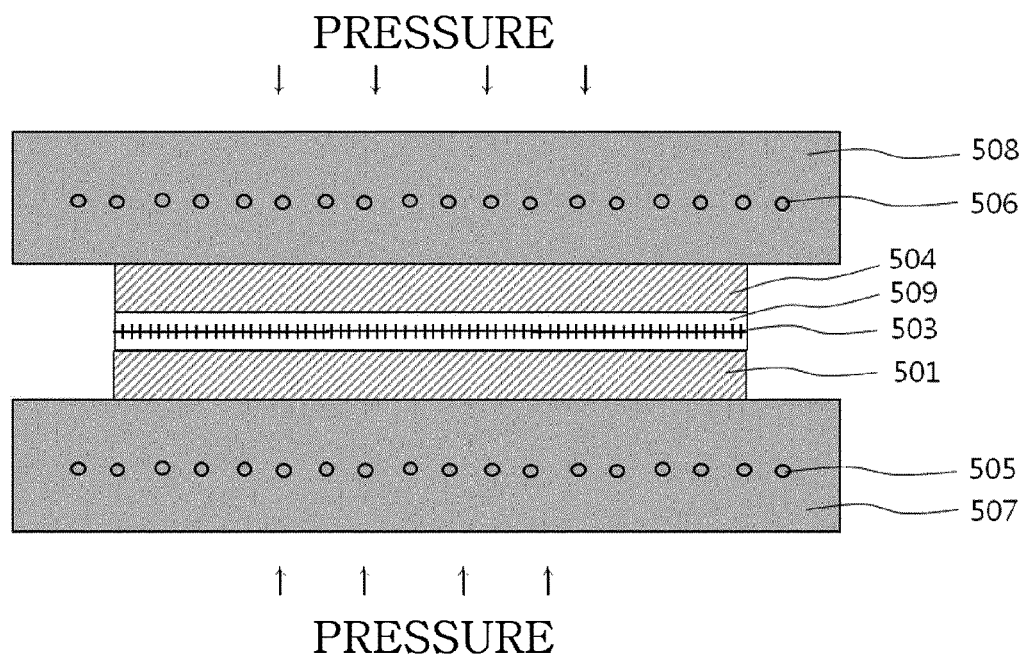
Figure 5E:
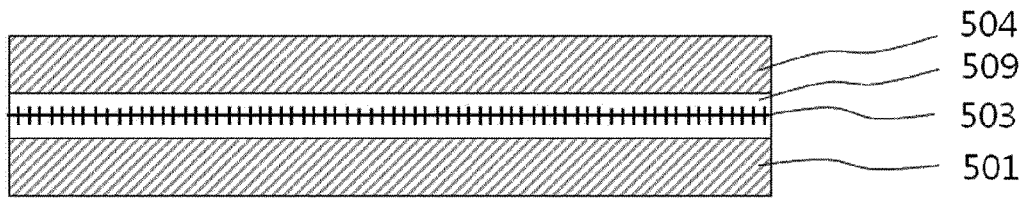
Figure 5F:
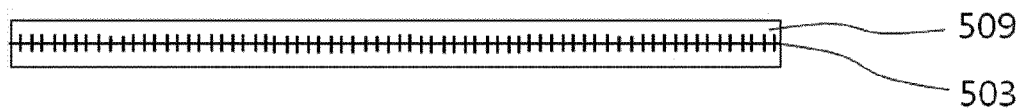

In lieu of two rollers (a pair of rollers), N pairs of rollers may be used. As illustrated in FIG. 4, when N pairs of rollers are used, a period of time taken to flatten the surface of the polyamic acid film or polyimide film having impregnated glass fabric may be shortened to 1/N than when using only a pair of rollers. This is because the simultaneous flattening effect by N pairs of rollers equals the effect of carrying out the flattening process N times by a pair of rollers.

After positioning the polyamic acid film or polyimide film having impregnated glass fabric between the rollers, the rollers and the polyamic acid film or polyimide film having impregnated glass fabric located therebetween may be placed together in an environmental chamber to perform a flattening process while the temperature of the chamber is adjusted to between the glass transition temperature of the polyamic acid film having impregnated glass fabric and the imidization temperature thereof, or between the glass transition temperature of the polyimide film and the thermal decomposition temperature thereof.

Also in the present invention, the rotational speed of the rollers is adjusted depending on, in the first flattening step, the glass transition temperature of the polyamic acid film having impregnated glass fabric, the imidization temperature thereof, the temperature of the rollers, the temperature of the environmental chamber for heating the rollers and the polyamic acid film having impregnated glass fabric, and the magnitude of pressure applied between the rollers. Furthermore, it is adjusted depending on, in the second flattening step, the glass transition temperature of the polyimide film having impregnated glass fabric, the thermal decomposition temperature thereof, the temperature of the rollers, the temperature of the environmental chamber for heating the rollers and the polyimide film having impregnated glass fabric, and the magnitude of pressure applied between the rollers.

Also in the present invention, the first or the second flattening step may be executed in such a manner that the polyamic acid film or the polyimide film is placed between two flat plates and flattened by pressure (FIGS. 5a to 5f).

Specifically, flattening the polyamic acid film or the polyimide film may be performed by sandwiching the film between two glass plates and then placing them between two flat plates equipped with heaters so that a predetermined pressure is applied perpendicular to the surfaces of the two flat plates for a predetermined period of time.

The width of the polyamic acid film or polyimide film having impregnated glass fabric is the same as that of the two glass plates, or preferably ranges from at least 70% to 100% of the width of the two glass plates. If the width of the polyamic acid film or polyimide film having impregnated glass fabric is less than 70% of the width of the two glass plates, the glass plates may easily break down by non-uniform pressure. In contrast, if the width thereof exceeds the width of the glass plates (greater than 100%), the portion of the film larger than the glass plates is not flattened because pressure is not applied thereto.

Furthermore, the two glass plates and the polyamic acid film or polyimide film having impregnated glass fabric disposed therebetween are preferably positioned in the central part of the two flat plates so that pressure is uniformly applied from the two flat plates.

The two glass plates used to flatten the polyamic acid film or polyimide film having impregnated glass fabric are preferably made of flat glass the surface of which is hard and flat with a surface roughness of 0.5 to 2 nm and a melting temperature of 500° C. or higher. Also, instead of the glass plates, stainless steel plates may be used, which have hard and flat surfaces with a surface roughness of 0.5 to 2 nm and a melting temperature of 500° C. or higher.

The temperature of the two flat plates is preferably set between $T_g$ of the polyamic acid film having impregnated glass fabric and the imidization temperature thereof, or between $T_g$ of the polyimide film and the thermal decomposition temperature thereof.

Also, a period of time taken to apply pressure perpendicular to the surfaces of the two flat plates may vary depending on the temperature of the two flat plates and the magnitude of applied pressure, or depending on the temperature of the chamber for heating the two flat plates and the polyamic acid film or polyimide film having impregnated glass fabric and the magnitude of applied pressure. For example, a period of time taken to apply pressure is preferably set within 2 hr under the condition that the temperature of the two flat plates is 300° C. and a pressure applied to the two glass plates is 17 MPa.

After locating the polyamic acid film or polyimide film having impregnated glass fabric between the two flat plates, the flat plates and the polyamic acid film or polyimide film having impregnated glass fabric located therebetween may be placed together in an environmental chamber to perform a flattening process while the temperature of the chamber is adjusted to between $T_g$ of the polyamic acid film having impregnated glass fabric and the imidization temperature thereof, or between $T_g$ of the polyimide film and the thermal decomposition temperature thereof.

As mentioned above, the method of manufacturing the polyimide film including two flattening steps according to the present invention is advantageous because the polyamic acid film having low hardness and $T_g$ is flattened within a short period of time under conditions of low temperature and pressure, and thereby a period of time taken to flatten the polyimide film having very high hardness and $T_g$ may be drastically reduced. Hence, this implies two important meanings on the flattening process in terms of mass production of a film for a display cover window and a display substrate.

First, the surface roughness of the polyimide film before the second flattening step may be lowered to about ⅐ when the first flattening step for flattening the polyamic acid film is performed compared to when the first flattening step is not. Accordingly, a period of time taken to implement the second flattening step for flattening the polyimide film may be remarkably shortened, and thus at least five-times benefits may be gained in view of production efficiency and cost.

Second, as the period of time taken to perform the second flattening step may be remarkably shortened, a browning phenomenon in which the polyimide film is gradually turned brown may be considerably reduced at about 300° C. that is the optimum temperature for flattening the polyimide film. When only the second flattening step is conducted without the first flattening step, the yellowness index of the polyimide film is 5.36, but is significantly lowered to 2.65 when both the first and the second flattening step are carried out. Considering the high optical transmittance (90% or more) necessary for a film for a display cover window and a display substrate, the two flattening steps disclosed in the present invention are regarded as essential.

Meanwhile, the method of manufacturing the colorless transparent polyimide film having impregnated glass fabric and of flattening the surface thereof according to the present invention may be accomplished even by only flattening the surface of the polyimide film having impregnated glass fabric, without performing the first flattening step for flattening the polyamic acid film.

If so, however, the rotational speed of the rollers useful in the flattening process is further decreased, and thus a period of time taken to perform the flattening process may be considerably increased and surface roughness may become higher, and thereby the flattening process has to be conducted at a higher temperature, which is undesirable.

In addition, the present invention addresses a polyimide film having impregnated glass fabric, manufactured by the aforementioned method.

In the present invention, the polyimide film having impregnated glass fabric is preferably 10~1000 μm thick, and the glass fabric is preferably 5~500 μm thick.

Below is a description of a two-step flattening method according to the present invention with reference to the accompanying drawings.

FIGS. 3a to 3f illustrate a process of flattening the surface of a colorless transparent polyamic acid film having impregnated glass fabric and the surface of a colorless transparent polyimide (CPI) film substrate having impregnated glass fabric, using a pair of rollers, according to the present invention.

FIG. 3a illustrates the colorless transparent polyamic acid film 301 having impregnated glass fabric and the glass fabric film 302 having a thickness of 25 μm incorporated in the polyamic acid film. The surface roughness of the colorless transparent polyamic acid film 301 having impregnated glass fabric is 273 nm (RMS).

Figure 8A:
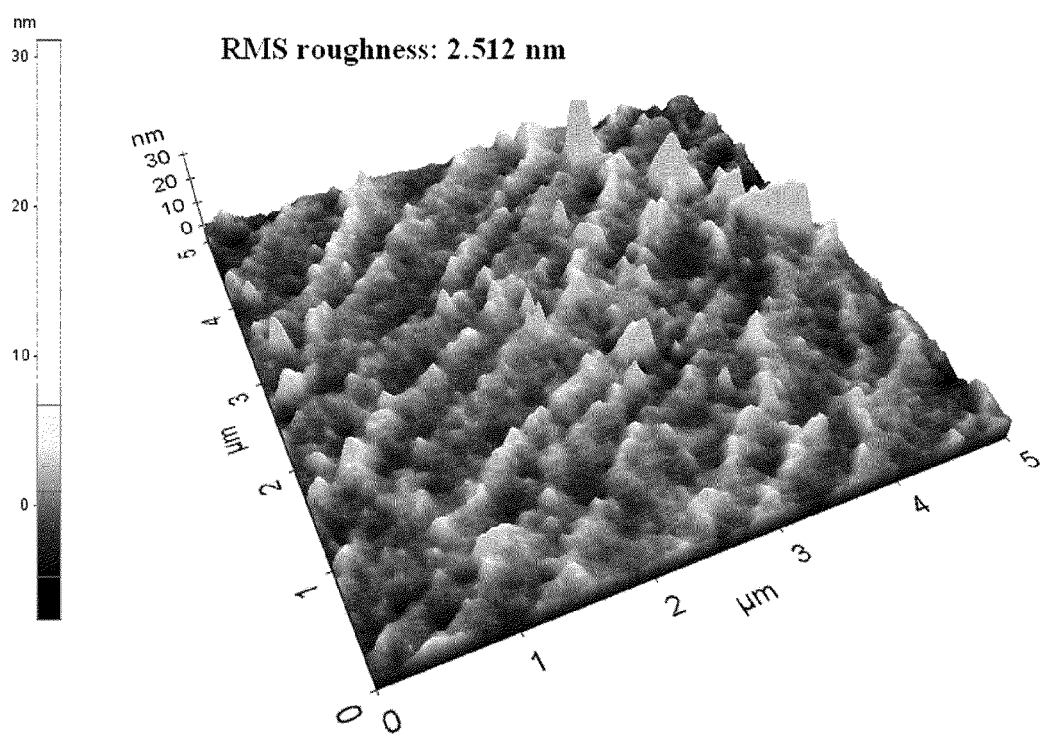
FIG. 8a is an AFM image illustrating the surface roughness of the flattened polyamic acid film having impregnated glass fabric according to a third embodiment of the present invention.

As illustrated in FIG. 3b, the colorless transparent polyamic acid film 301 having impregnated glass fabric is placed between a pair of rollers 305, 306 having built-in heaters 303, 304, and the rollers are heated to 80° C. As illustrated in FIG. 3c, a pressure of 3 MPa is applied perpendicular to the contact surfaces between the pair of rollers 305, 306 and the colorless transparent polyamic acid film 301 having impregnated glass fabric, and the colorless transparent polyamic acid film 301 having impregnated glass fabric is passed between the pair of rollers which are rotated in opposite directions around the rotating shafts 307, 308. Thereby, the surface of the colorless transparent polyamic acid film 301 having impregnated glass fabric with a surface roughness of 273 nm (RMS) is flattened to a surface roughness 309 of about 2.51 nm (RMS) (FIG. 8a).

The surface roughness of the two rollers 305, 306 is 2 nm (RMS) or less.

The colorless transparent polyamic acid film 309 having impregnated glass fabric flattened to a surface roughness of about 2.51 nm (RMS) undergoes thermal imidization in the temperature range from 110° C. to 250° C., and is thus formed into a colorless transparent polyimide film 310 having impregnated glass fabric. As such, the surface of the resulting film is roughened again to 56 nm (RMS) as illustrated in FIG. 3d.

Figure 3E:
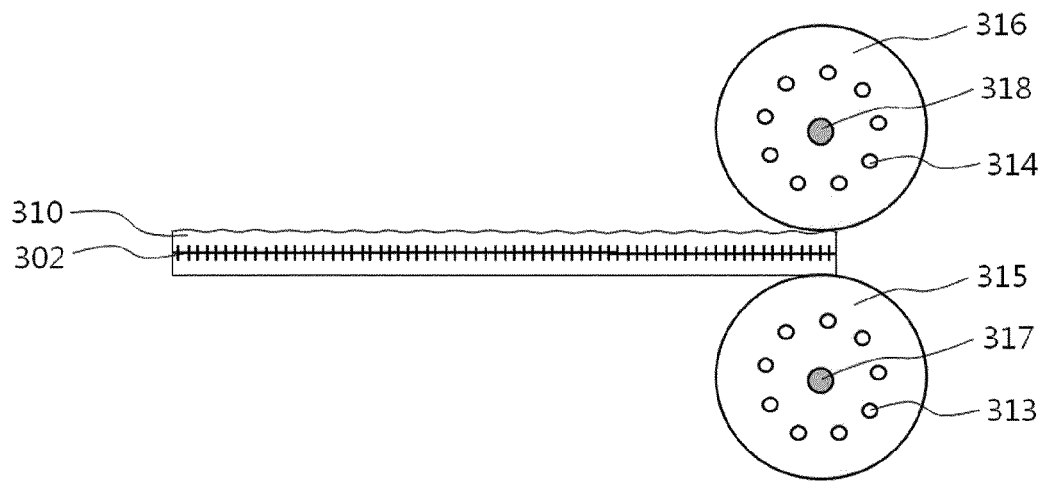
Figure 3F:
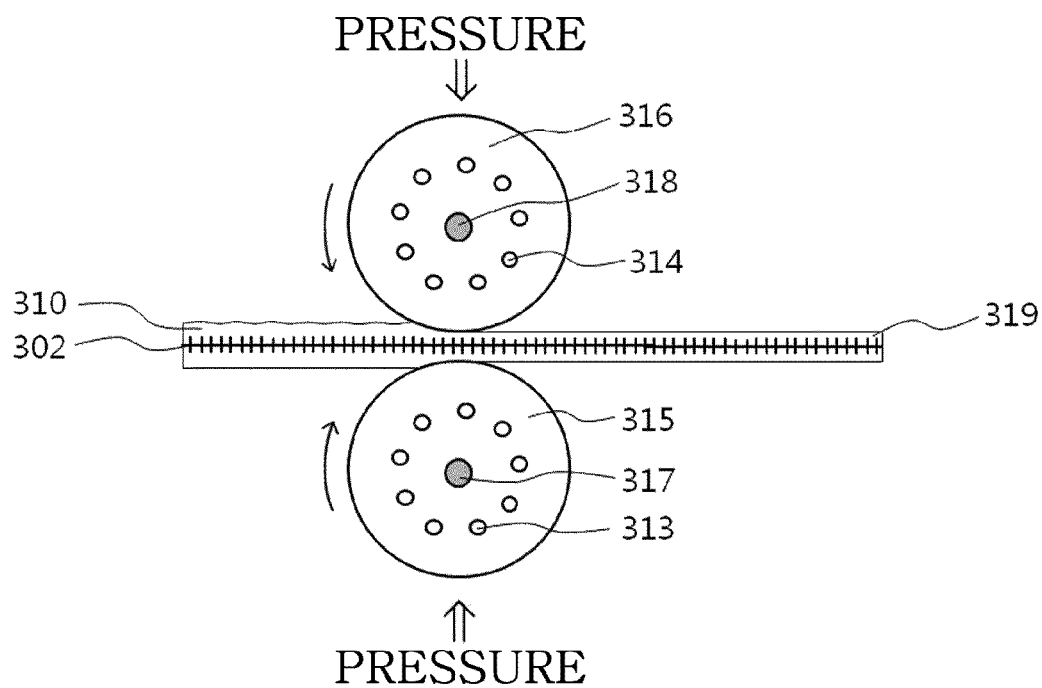
Figure 8B:
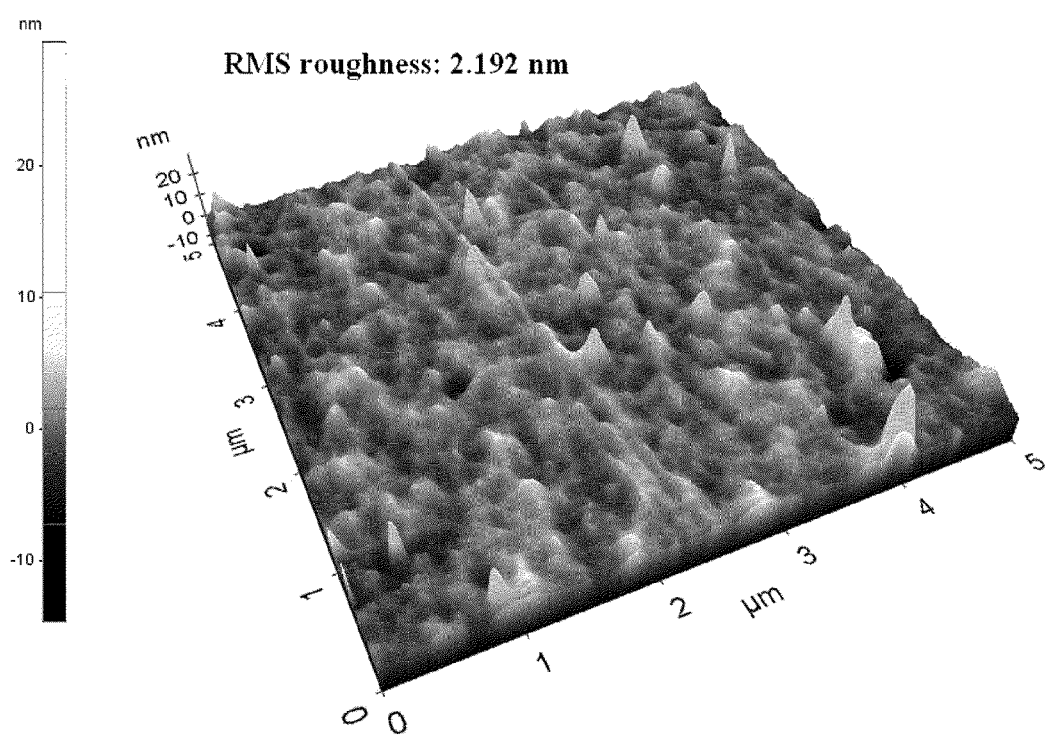
FIG. 8b is an AFM image illustrating the surface roughness of the flattened polyimide film having impregnated glass fabric according to the third embodiment of the present invention.

As illustrated in FIG. 3e, the colorless transparent polyimide film 310 having impregnated glass fabric formed by imidization is placed between a pair of rollers 315, 316 having built-in heaters 313, 314, and the two rollers are heated to 300° C. Thereafter, as illustrated in FIG. 3f, a pressure of 17 MPa is applied perpendicular to the contact surfaces between the two rollers 315, 316 and the colorless transparent polyimide film 310 having impregnated glass fabric, and the colorless transparent polyimide film having impregnated glass fabric is passed between the two rollers which are rotated in opposite directions around the rotating shafts 317, 318 at a speed of 0.05 revolutions/sec. Thereby, the colorless transparent polyimide film 310 having impregnated glass fabric, with a surface roughness of 56 nm (RMS), may be flattened to a surface roughness 319 of about 2.19 nm (RMS) (FIG. 8b).

As such, the surface roughness of the two rollers 315, 316 is set to 2 nm (RMS) or less.

Under the condition that the temperature of the two rollers is 300° C., the maximum rotational speed of a pair of rollers required to flatten the surface of the colorless transparent polyimide film having impregnated glass fabric falls within 0.05 revolutions/sec when the pressure applied to the pair of rollers is 17 MPa, but falls within 0.025 revolutions/sec when the applied pressure is 15 MPa. Further, when the applied pressure is 20 MPa, the rotational speed of the rollers may range within 0.1 revolutions/sec. As the pressure applied to the colorless transparent polyimide film having impregnated glass fabric for use in a flexible display is higher, deformation of the colorless transparent polyimide film may rapidly occur. In contrast, as the applied pressure is lower, deformation of the colorless transparent polyimide film takes place slowly.

For example, assuming that a period of time taken for the flattening process is 1 hr upon application of a pressure of 17 MPa to the pair of rollers, 2 hr is required when the applied pressure is 15 MPa, and a period of time as short as 30 min is taken when the applied pressure is 20 MPa.

FIG. 4 schematically illustrates a process of reducing the period of time taken to flatten the surface of the colorless transparent polyamic acid film having impregnated glass fabric and the colorless transparent polyimide film having impregnated glass fabric using N pairs of rollers instead of the two rollers (the pair of rollers).

As illustrated in FIG. 4, when N pairs of rollers are used in lieu of the pair of rollers, the period of time taken to flatten the surface of the colorless transparent polyamic acid film having impregnated glass fabric and the colorless transparent polyimide film having impregnated glass fabric may be lowered to 1/N, compared to when using only a pair of rollers. This is because the simultaneous flattening effect by N pairs of rollers equals the effect of performing the flattening process N times by a pair of rollers.

In the course of flattening the surface of the colorless transparent polyamic acid film having impregnated glass fabric and the colorless transparent polyimide film having impregnated glass fabric using N pairs of rollers, when the temperature of each pair of rollers is gradually increased from $T_g$ of the colorless transparent polyamic acid film to less than the thermal decomposition temperature of the colorless transparent polyimide film, the surface flattening process and the imidization reaction of the colorless transparent polyamic acid film having impregnated glass fabric, and the surface flattening process of the colorless transparent polyimide film having impregnated glass fabric, may be implemented by means of a roll-to-roll process.

A better understanding of the present invention may be obtained through the following examples which are set forth to illustrate, but are not to be construed to limit the present invention, which will be apparent to those skilled in the art.

Example 1

Flattening of Polyimide Film Using Flat Plates 2.31 g ($5.2 \times 10^{-3}$ mol) of 4,4'-(hexafluoroisopropylidene) diphthalic anhydride (6FDA) as a dianhydride monomer and 1.29 g ($5.2 \times 10^{-3}$ mol) of bis(3-aminophenyl)sulfone (APS) as a diamine monomer were added to 26.99 g of a dimethyl acetamide (DMAc) solvent and slowly stirred using a magnetic stirrer at 0° C. for 1 hr in a nitrogen atmosphere so that the monomers were completely dissolved, and the resulting solution was polymerized with vigorous stirring at room temperature (25° C.) for 15 hr or longer, thus preparing a polyamic acid solution (PA-1).

Further, 5.47 g ($1.231 \times 10^{-2}$ mol) of 6FDA as a dianhydride monomer and 4.46 g ($1.231 \times 10^{-2}$ mol) of 2,2-bis(3-amino-4-methylphenyl)hexafluoropropane (BAMF) were added to 74.44 g of a DMAc solvent, and treated in the same manner as in the above procedures, thus preparing a polyamic acid solution (PA-2), after which the polyamic acid solutions PA-1 and PA-2 were mixed at a weight ratio of 4:6 (5.96 g, 8.94 g), thus preparing a polyamic acid mixed solution.

A 25 μm thick glass fabric was placed on a glass plate having an area of 10 cm×10 cm, uniformly impregnated with the polyamic acid mixed solution, and then placed in a vacuum oven. The inner temperature of the vacuum oven was increased from room temperature to 50° C. at a rate of 5° C./min, maintained at 50° C. for 5 min, increased from 50° C. to 110° C. at a rate of 2.5° C./min and then maintained at 110° C. for 3 hr, and the vacuum level in the vacuum oven was decreased to −0.1 MPa or less, so that the solvent was rapidly evaporated, thus forming a polyamic acid film.

The polyamic acid film having impregnated glass fabric was heated from 110° C. to 170° C. at a rate of 0.4° C./min at a vacuum of −0.1 MPa or less, further heated from 170° C. to 250° C. at a rate of 1° C./min, and maintained at 250° C. for 30 min, whereby the polyamic acid film was subjected to imidization by stepwise thermal curing, thus manufacturing a colorless transparent polyimide (CPI) film having impregnated glass fabric.

Then, another glass plate having the same dimension and kind as in the above glass plate was disposed on the colorless transparent polyimide (CPI) film having impregnated glass fabric. As such, the surface roughness of the two glass plates used was not more than 1.2 nm (RMS). They were positioned in the central part between the lower flat plate having built-in heaters and the upper flat plate having built-in heaters, and the two flat plates were heated to 300° C. using the heaters provided to the two flat plates, after which a pressure of 17 MPa was applied perpendicular to the surfaces of the two flat plates to the polyimide film for 1 hr, thereby flattening the surface of the colorless transparent polyimide film.

The pressure applied to the two flat plates was released, after which the two glass plates and the flattened colorless transparent polyimide film disposed therebetween were separated from the two flat plates. Further, the colorless transparent polyimide film having impregnated glass fabric was separated from the lower and the upper glass plate, giving a flattened colorless transparent polyimide film.

When the surface roughness of the polyimide film having impregnated glass fabric was 0.2 μm or more, it was measured using an alpha-step (XE-100, Park Systems, Korea). In contrast, when the surface roughness thereof was less than 0.2 μm, it was measured using AFM (Atomic Force Microscope; Dektak-8, VEECO, USA).

Figure 6:
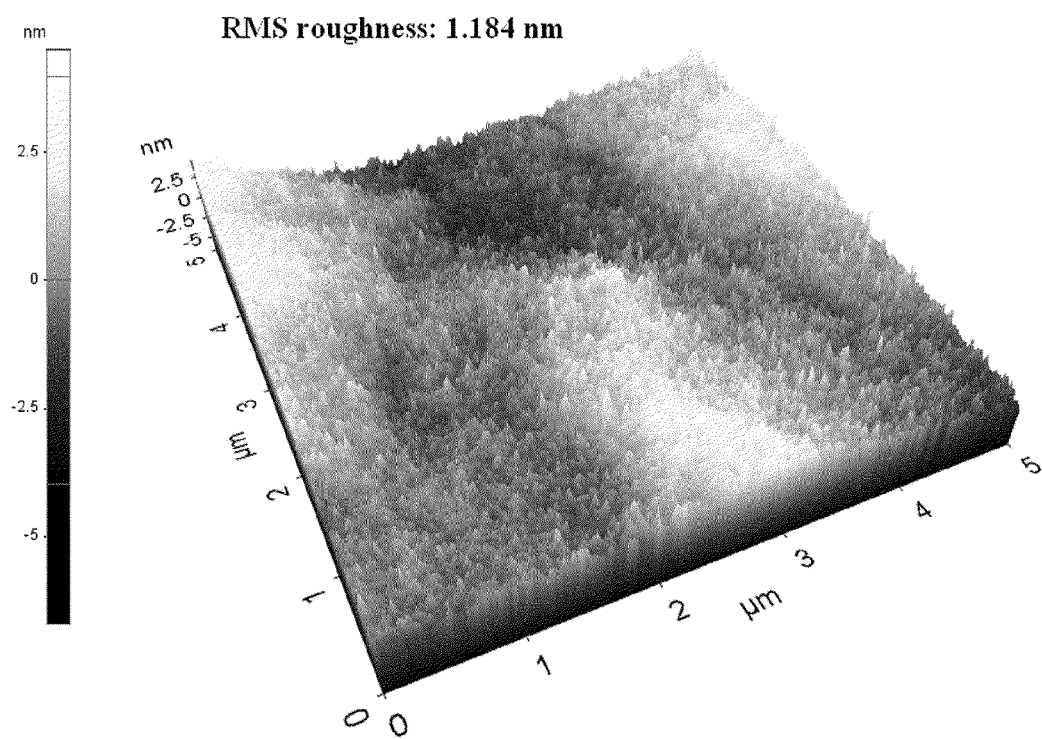
FIG. 6 is an atomic force microscope (AFM) image illustrating the surface roughness of the flattened polyimide film having impregnated glass fabric according to a first embodiment of the present invention.

The surface roughness of the colorless transparent polyimide film having impregnated glass fabric before the flattening process was 0.4 μm (RMS), whereas the surface roughness of the flattened colorless transparent polyimide film was decreased to 1.184 nm (RMS) (FIG. 6).

Also, the coefficient of thermal expansion (CTE) of the flattened colorless transparent polyimide film was measured using a thermo-mechanical analyzer (TMA-2940, TA Instruments, USA). The CTE of the colorless transparent polyimide film having impregnated glass fabric was 11 ppm/° C. in the temperature range from room temperature to 400° C. Taking into consideration that the CTE of a colorless transparent polyimide film having no impregnated glass fabric is 61 ppm or more, it is confirmed that the glass fabric is very effective at suppressing thermal expansion of the colorless transparent polyimide film.

Example 2

Flattening of Polyimide Film Using Rollers

A polyamic acid mixed solution was prepared in the same manner as in Example 1, after which a glass fabric was placed on a support and then uniformly impregnated with the polyamic acid mixed solution.

The glass fabric impregnated with the polyamic acid mixed solution and the support were placed together in an environmental chamber, and the inner temperature of the chamber was increased from room temperature to 50° C. at a rate of 5° C./min, maintained at 50° C. for 5 min, increased from 50° C. to 110° C. at a rate of 2.5° C./min and then maintained at 110° C. for 3 hr, and the solvent was thus evaporated, thereby forming a polyamic acid film.

The colorless transparent polyamic acid film having impregnated glass fabric was heated from 110° C. to 170° C. at a rate of 0.4° C./min, further heated from 170° C. to 250° C. at a rate of 1° C./min, and maintained at 250° C. for 30 min, and thereby the polyamic acid film was subjected to imidization by stepwise thermal curing, resulting in a colorless transparent polyimide film having impregnated glass fabric.

The colorless transparent polyimide film having impregnated glass fabric was located between a pair of rollers having a surface roughness of 2 nm (RMS) and a diameter of 20 cm. Further, the temperature of the pair of rollers was increased to 300° C. using built-in heaters provided to the pair of rollers, and a pressure of 17 MPa was applied perpendicular to the contact surfaces between the pair of rollers and the colorless transparent polyimide film having impregnated glass fabric, and the colorless transparent polyimide film having impregnated glass fabric was passed between the pair of rollers which were rotated in opposite directions around the rotating shafts at a speed of 0.01 revolutions/sec.

When the surface roughness of the polyimide film having impregnated glass fabric was 0.2 μm or more, it was measured using an alpha-step (XE-100, Park Systems, Korea). In contrast, when the roughness was less than 0.2 μm, it was measured using AFM (Dektak-8, VEECO, USA).

Figure 7:
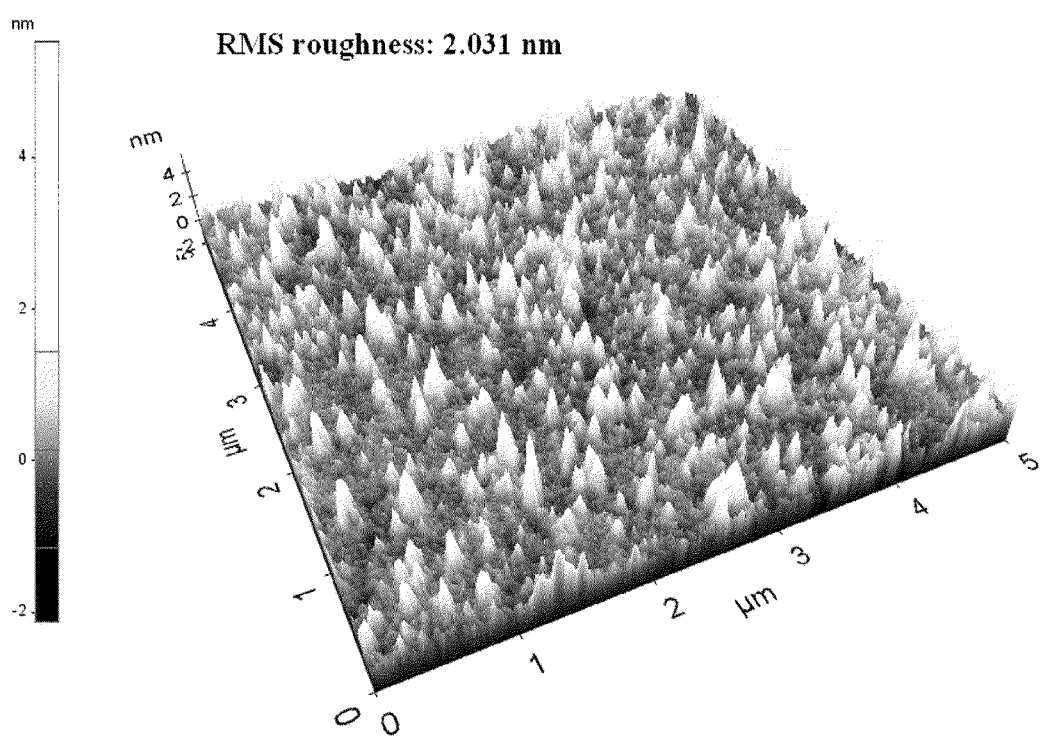
FIG. 7 is an AFM image illustrating the surface roughness of the flattened polyimide film having impregnated glass fabric according to a second embodiment of the present invention.

The surface roughness of the colorless transparent polyimide film having impregnated glass fabric before the flattening process was 0.4 μm (RMS), whereas the surface roughness of the flattened colorless transparent polyimide film was decreased to 2.031 nm (RMS) (FIG. 7).

Also, the CTE of the flattened colorless transparent polyimide film was measured using a thermo-mechanical analyzer (TMA-2940, TA Instruments, USA). The CTE of the colorless transparent polyimide film having impregnated glass fabric was 11 ppm in the temperature range from room temperature to 400° C. Taking into consideration that the CTE of a colorless transparent polyimide film having no impregnated glass fabric is 61 ppm or more, it is confirmed that the glass fabric is very effective at suppressing thermal expansion of the colorless transparent polyimide film.

Example 3

Flattening of Polyimide Film Using Two Flattening Steps

A polyamic acid film was formed in the same manner as in Example 2.

The polyamic acid film was separated from the support and located between a pair of rollers having built-in heaters with a surface roughness of 2 nm (RMS) and a diameter of 20 cm. The rollers were heated to 80° C., and the spacing between the rollers was adjusted and a pressure of 3 MPa was applied perpendicular to the contact surfaces between the rollers and the colorless transparent polyamic acid film having impregnated glass fabric, and the colorless transparent polyamic acid film having impregnated glass fabric was passed between the pair of rollers which were rotated in opposite directions around the rotating shafts at a speed of 0.1 revolutions/sec, thereby flattening the surface of the polyamic acid film having impregnated glass fabric (a first flattening step).

The flattened colorless transparent polyamic acid film having impregnated glass fabric was heated from 110° C. to 170° C. at a rate of 0.4° C./min, further heated from 170° C. to 250° C. at a rate of 1° C./min, maintained at 250° C. for 30 min, and thereby the polyamic acid film was subjected to imidization by stepwise thermal curing, ultimately forming a colorless transparent polyimide film having impregnated glass fabric. The surface of the polyimide film was roughened again to the level of 56 nm (RMS).

The colorless transparent polyimide film having impregnated glass fabric was located between a pair of rollers having built-in heaters with a surface roughness of 2 nm (RMS) and a diameter of 20 cm. Further, the temperature of the pair of rollers was increased to 300° C. using the built-in heaters, and the spacing between the pair of rollers was adjusted and a pressure of 17 MPa was applied perpendicular to the contact surfaces between the rollers and the colorless transparent polyimide film having impregnated glass fabric, and the colorless transparent polyimide film having impregnated glass fabric was passed between the pair of rollers which were rotated in opposite directions around the rotating shafts at a speed of 0.05 revolutions/sec, and thereby was flattened (a second flattening step).

When the surface roughness of the polyimide film having impregnated glass fabric was 0.2 μm or more, it was measured using an alpha-step (XE-100, Park Systems, Korea). In contrast, when the roughness was less than 0.2 μm, it was measured using AFM (Dektak-8, VEECO, USA).

In the first flattening step, the surface of the polyamic acid film having impregnated glass fabric, with a surface roughness of 273 nm (RMS), was flattened to a surface roughness of about 2.51 nm (RMS) (FIG. 8a). However, the surface of the colorless transparent polyimide film having impregnated glass fabric after imidization was roughened again to the level of 56 nm (RMS). By virtue of the second flattening step for flattening the polyimide film, the polyimide film having impregnated glass fabric, with a surface roughness of 56 nm (RMS), was flattened to a surface roughness of 2.19 nm (RMS) (FIG. 8b).

Also, the CTE of the flattened colorless transparent polyimide film was measured using a thermo-mechanical analyzer (TMA-2940, TA Instruments, USA).

The CTE of a colorless transparent polyimide film having no impregnated glass fabric was about 61 ppm/° C. in the temperature range from room temperature to $T_g$ (264° C.), but was drastically increased to 2837 ppm/° C. at a temperature equal to or higher than $T_g$. On the other hand, the CTE of the colorless transparent polyimide film having impregnated glass fabric was as low as 11 ppm/° C. without an increase in CTE due to glass transition in the temperature range from room temperature to 400° C. Thereby, it is confirmed that the glass fabric is very effective at suppressing thermal expansion of the colorless transparent polyimide film.

Although the preferred embodiments of the present invention have been disclosed for illustrative purposes, those skilled in the art will appreciate that various modifications, additions, substitutions and equivalents are possible, without departing from the scope and spirit of the invention as disclosed in the accompanying claims.

INDUSTRIAL APPLICABILITY

As described hereinbefore, the present invention provides a method of manufacturing a colorless transparent polyimide film having impregnated glass fabric and of flattening the surface thereof. According to the present invention, the surface roughness of the colorless transparent polyimide film having impregnated glass fabric can be flattened to the level of ones of nm from the level ranging of tens of nm to ones of μm, thus enabling a TFT process to be executed on a flexible display substrate and preventing surface scattering of light. Thereby, the colorless transparent polyimide film can be increased in optical transmittance and transparency and can thus be utilized as cover windows for flat panel displays and mobile phones.

Also, the glass fabric incorporated in the colorless transparent polyimide film can enhance tensile strength of the colorless transparent polyimide film, thus drastically increasing flexibility and lifetime of flexible display substrates and cover windows. Furthermore, the colorless transparent polyimide cover windows having impregnated glass fabric can be used to replace an existing glass cover windows for a flat panel display, thereby remarkably decreasing the weight of the displays and eliminating the risk of damage thereof.

Therefore, the flattened colorless transparent polyimide films having impregnated glass fabric according to the present invention can be very efficiently employed in the fields of flexible displays and flat panel displays.

What is claimed is:

1. A method of manufacturing a polyimide film having impregnated glass fabric, comprising:
   (1) impregnating glass fabric with a polyamic acid solution, thus obtaining a polyamic acid film having impregnated glass fabric;
   (2) flattening the polyamic acid film having impregnated glass fabric obtained in (1) (first flattening process) at a temperature between the Tg of the polyamic acid film and the imidization temperature of the polyamic acid;
   (3) subjecting the polyamic acid film obtained in (2) to imidization, thus obtaining a polyimide film having impregnated glass fabric; and
   (4) flattening the polyimide film having impregnated glass fabric obtained in (3) (second flattening process) at a temperature between the Tg of the polyimide film and the thermal decomposition temperature of the polyimide film;
   wherein the flattening steps are performed by applying pressure using cylindrical rollers or flat plates having a surface roughness of 0.5 to 2 nm.

2. The method of claim 1, wherein the polyamic acid solution in (1) is prepared by dissolving a dianhydride compound and a diamine compound in a solvent and then performing polymerization.

3. The method of claim 2, wherein the dianhydride compound comprises any one or a mixture of two or more selected from the group consisting of 4,4'-oxydiphthalic anhydride (OPDA), pyromellitic dianhydride (PMDA), 3,3',4,4'-diphenylsulfone tetracarboxylic dianhydride (DSDA), 3,3',4,4'-benzophenone tetracarboxylic dianhydride (BTDA), 4-(2,5-dioxotetrahydrofuran-3-yl)-1,2,3,4-tetrahydronaphthalene-1,2-dicarboxylic anhydride (DTDA), 4,4'-bisphenol A dianhydride (BPADA), 4,4'-(hexafluoroisopropylidene)diphthalic anhydride (6FDA), bicycle[2.2.2]oct-7-ene-2,3,5,6-tetracarboxylic dianhydride (BCDA), 3,3',4,4'-biphenyl tetracarboxylic dianhydride (BPDA), 5-(2,5-dioxotetrahydrofuryl)-3-methyl-3-cyclohexene-1,2-dicarboxylic anhydride (DOMDA), ethylene diamine tetraacetic dianhydride (EDTE), and 1,2,4,5-cyclohexanetetracarboxylic dianhydride (CHDA).

4. The method of claim 2, wherein the diamine compound comprises any one or a mixture of two or more selected from the group consisting of 2,2-bis(3-amino-4-hydroxyphenyl)hexafluoropropane (BAHFP), 1,3-bis(3-aminophenoxy)benzene (m-BAPB), 4,4'-bis(4-aminophenoxy)biphenyl (p-BAPB), 2,2-bis(3-aminophenyl)hexafluoropropane (BAPF), bis[4-(3-aminophenoxy)phenyl]sulfone (m-BAPS), 2,2-bis[4-(4-aminophenoxy)phenyl]sulfone (p-BAPS), bis(3-aminophenyl)sulfone (APS), m-xylylenediamine (m-XDA), p-xylylenediamine (p-XDA), 3,4'-oxydianiline (3,4-ODA), 2,2-bis(3-amino-4-methylphenyl)hexafluoropropane (BAMF), 4,4'-diaminooctafluorobiphenyl, 3,3'-dihydroxybenzidine, 2,2'-ethylenedianiline, 2,2'-bis(trifluoromethyl)benzidine (TFB), 2,2',5,5'-tetrachlorobenzidine, bis(3-aminophenyl)methanone, 2,7-diaminofluorene, 2-chloro-p-phenylenediamine, 1,3-bis(3-aminopropyl)-tetramethyldisiloxane, 1,1-bis(4-aminophenyl)cyclohexane, 9,9-bis(4-aminophenyl)fluorene, 5-(trifluoromethyl)-1,3-phenylenediamine, 4,4'-methylenebis(2-methylcyclohexylamine), 4-fluoro-1,2-phenylenediamine, 4,4'-(1,3-phenylenediisopropylidene)bisaniline, 4-nitro-1,3-phenylenediamine, 4-chloro-1,3-phenylenediamine, 1,3,5-triazine-2,4,6-triamine (Melamine), 3,5-diaminobenzonitrile, 1,3-bis(aminomethyl)cyclohexane (m-CHDA), 1,4-bis(aminomethyl)cyclohexane (p-CHDA), 2,2-bis[4-(4-aminophenoxy)phenyl]hexafluoropropane (6FBAPP), 2,2'-bis(trifluoromethyl)benzidine (MDB), 4,4'-oxydianiline (4,4'-ODA), 2,2-bis[4-(4-aminophenoxy)phenyl] propane (BAPP), 1,3-cyclohexanediamine, 1,4-cyclohexanediamine, and bis(4-aminophenyl) sulfide (4,4'-SDA).

5. The method of claim 4, wherein the flattening steps are performed using cylindrical rollers.

6. The method of claim 4, wherein the flattening steps are performed by positioning the polyamic acid film or the polyimide film between two flat plates and then applying pressure thereto.

7. The method of claim 1, wherein imidization in (3) is performed by subjecting the polyamic acid film to a thermal process (thermal imidization) to give a polyimide film having impregnated glass fabric.

8. The method of claim 7, wherein the polyamic acid film is subjected to thermal imidization in a temperature range of 100~300° C.

9. The method of claim 1, wherein imidization in (3) is performed by subjecting the polyamic acid film to a chemical process (chemical imidization) to give a polyimide film having impregnated glass fabric.

\* \* \* \* \*